INVENTOR
Frank W. Fuller
Gardner B. Moore
BY Robert M. Dunning
ATTORNEY

May 17, 1955  F. W. FULLER ET AL  2,708,288
METHOD AND APPARATUS FOR MOLDING PLASTIC
Filed April 26, 1950.  3 Sheets-Sheet 2
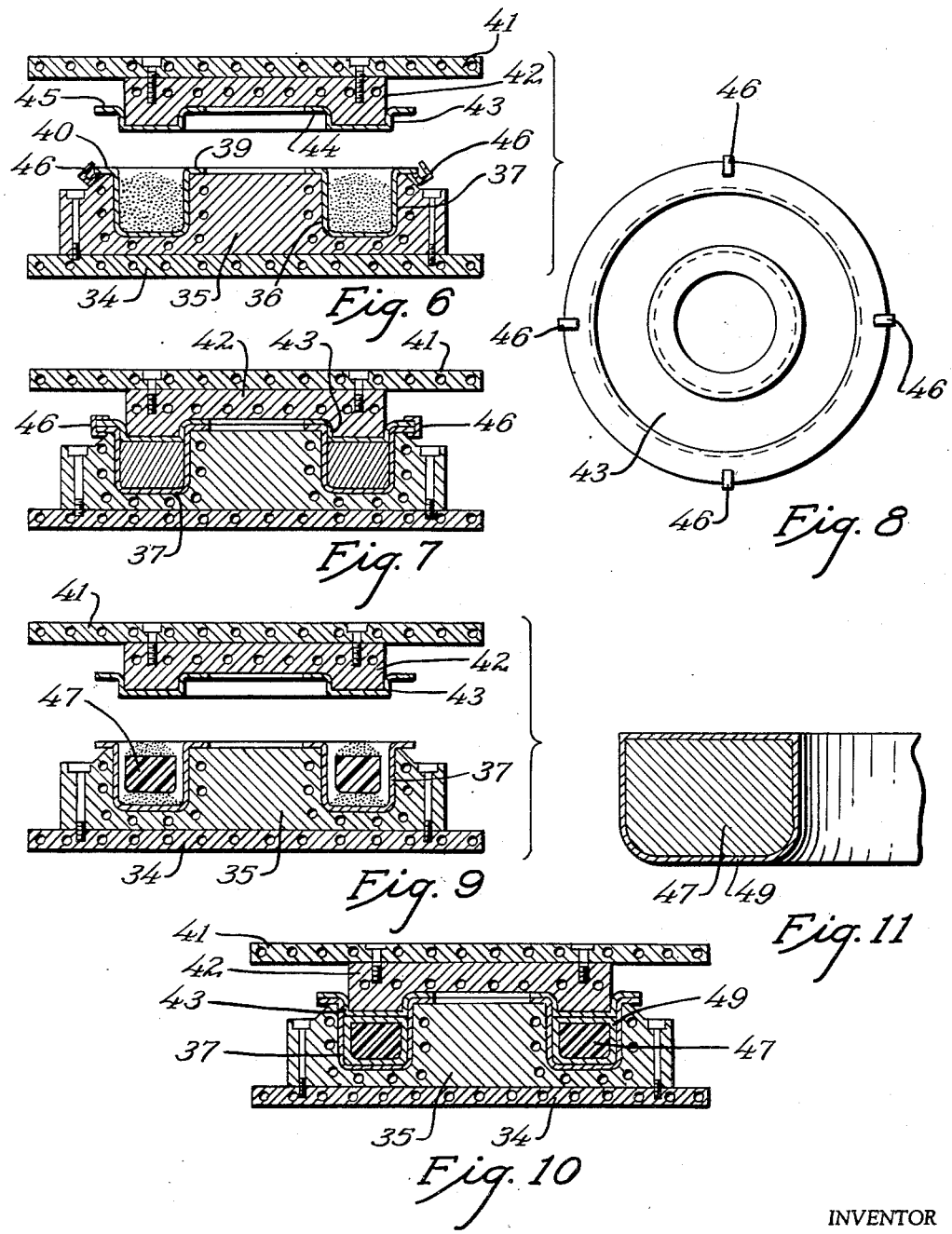
INVENTOR
Frank W. Fuller
Gardner B. Moore
BY Robert M. Dunning
ATTORNEY May 17, 1955 F. W. FULLER ET AL 2,708,288
METHOD AND APPARATUS FOR MOLDING PLASTIC
Filed April 26, 1950 3 Sheets-Sheet 3

INVENTOR
Frank W. Fuller
Gardner B. Moore
BY Robert M. Dunning
ATTORNEY

United States Patent Office 2,708,288
Patented May 17, 1955

2,708,288

METHOD AND APPARATUS FOR MOLDING PLASTIC

Frank W. Fuller and Gardner B. Moore, St. Paul, Minn.

Application May 26, 1950, Serial No. 164,372

8 Claims. (Cl. 18—34)

Our invention relates to an improvement in method and apparatus for molding plastic and the like, wherein it is desired to provide a method of simplifying and speeding the molding operation.

There are several difficulties usually experienced with conventional plastic molding methods which make the final product relatively costly. In the thermo-setting group of plastic materials it is difficult to preform bulky materials. The loading of the molds is awkward. Where conventional preforms are used, it is extremely difficult to eliminate what are called "flow lines" or "weld marks." In the compression molding of thermo-plastic materials the heating and cooling cycle of the molds is slow and expensive. In any other material it is extremely difficult to preheat thermo-plastic materials prior to the compression molding thereof, and it is impossible to remove the molded piece prior to being chilled down to the point where it is completely set up.

An object of the present invention lies in a method and apparatus for speeding up the molding process and substantially simplifying the same. As a result the molding time may be substantially reduced and various other difficulties normally experienced during the molding operation may be overcome.

A feature of the present invention lies in the provision of a removable mold liner or molding pan which fits within the mold cavity or chase and within which the molding operation actually takes place. The use of such a mold liner or pan has numerous advantages. This pan may be formed of relatively thin gauge metal, making it possible to form the liners on a forming die. The inner surface of this liner may usually be polished more easily than the interior of a mold cavity. Similarly a multiple cavity mold may be provided with a series of similar liners removably supported by the chase or mold support so that the molding material may be placed in or removed from the mold cavity together with the liners or molding pans.

A feature of the present invention lies in the fact that the molding pans may be filled with the material to be molded, prior to insertion in the mold chase or support, thus decreasing the extent to which the mold must be opened in order to load the mold or remove the molded piece. In view of the fact that in compression molding the mold chase, the chase mounting plate, and other parts of the mold are usually heated to an elevated temperature, it is ordinarily difficult to properly fill the mold cavity and to remove the molded part without opening the mold to a considerable extent. Where the mold pan is previously filled and where the molded part may be removed with the mold pan, it is possible to remove the molded part without opening the mold to the usual extent.

An added feature of the present invention lies in the fact that the material being molded may, if desired, be heated before insertion into the mold, thus elevating the temperature of the material to be molded to a point where the material will flow easily when placed under pressure. After filling the mold pan, it may be heated in an oven or other suitable chamber so as to greatly reduce the molding cycle ordinarily required.

A feature of the present invention lies in the fact that the mold pan, may, if desired, be provided with a punch or force cover which cooperates with the mold pan and may act as a closure therefor. By pressing a force cover into the molding pan so as to produce the desired configuration at the top of the mold, additional advantages may be obtained when molding either thermo-plastic or thermo-setting material. The use of the force cover simplifies the punch construction. Furthermore, if the force cover is locked to the molding pan while the two parts are under compression, the mold may be removed from the mold cavity while the molding material is still at a plastic or semi-plastic condition. Thus it will be seen that additional time may be saved in the molding cycle as it is not necessary to keep the molded part in the mold until the mold has been chilled. Furthermore, by keeping the mold chase or cavity and punch at an elevated temperature, time usually required to reheat the mold may be saved.

An added feature of the present invention lies in the fact that the use of mold liners or molding pans is advantageous for use with bulky material having a high compression ratio. Such material may be previously compressed into the mold pan through the use of a cold press which condenses the bulky material to a fraction of its normal bulk without preheating the plastic material. This action minimizes the molding press opening, thus speeding up the cycle. As the air is partially exhausted from the compound during the preforming operation, the number of air blisters produced in the molding operation is reduced. Furthermore, if the molding pan is previously filled and partially compressed, time is saved in loading the mold as well as in discharging the molded product.

Another feature of the present invention lies in the fact that by the use of relatively thin gauge mold pans removably inserted into the mold cavity, the heat transfer through the molding material is slightly delayed, thereby heating the molding material at approximately the same time the punch is in contact with the top of the compound. This prevents the plastic compound from being partially preset by the heated mold walls and minimizes warpage, blistering and distortion in the finished product.

These and other objects and novel features of our invention will be more clearly and fully set forth in the following specification and claims.

In the drawings forming a part of my specification:

Figure 6 is a sectional view through a construction similar to that illustrated in Figure 5, but showing a mold pan cover used in conjunction with the mold pan.

Figure 7 is a view similar to Figure 6 showing the mold in closed position.

Figure 8 is a top plan view of the molding pan and cover removed from the mold.

Figure 9 is a view similar to Figure 6 showing the manner in which a core may be incorporated within the plastic body.

Figure 10 is a view similar to Figure 9 showing the mold in closed position.

Figure 11 is a cross sectional view through the resulting structure formed in the operation shown in Figures 9 and 10.

Figure 1:
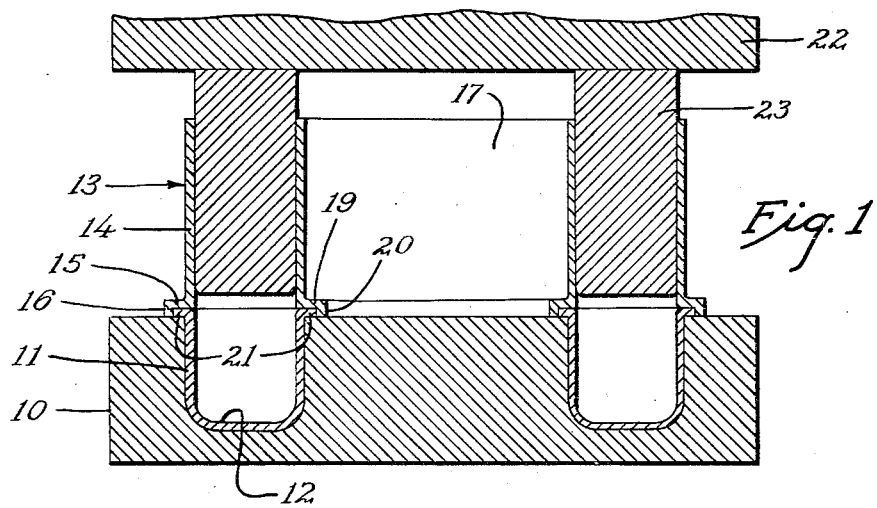
Figure 1 is a sectional view through a preforming press showing the manner in which bulky molding composition may be preformed.
Figure 2:
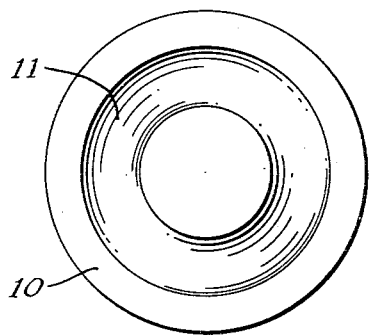
Figure 2 is a top plan view of the chase used either as a preforming mold or as the plastic mold.
Figure 3:
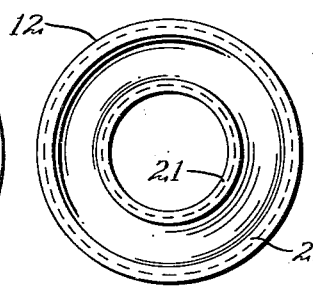
Figure 3 is a plan view of the mold liner or molding pan forming a part of the present invention.
Figure 4:
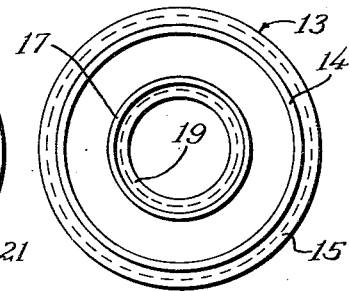
Figure 4 illustrates in plan a fence which may be used for guiding material into the molding pan.
Figure 5:
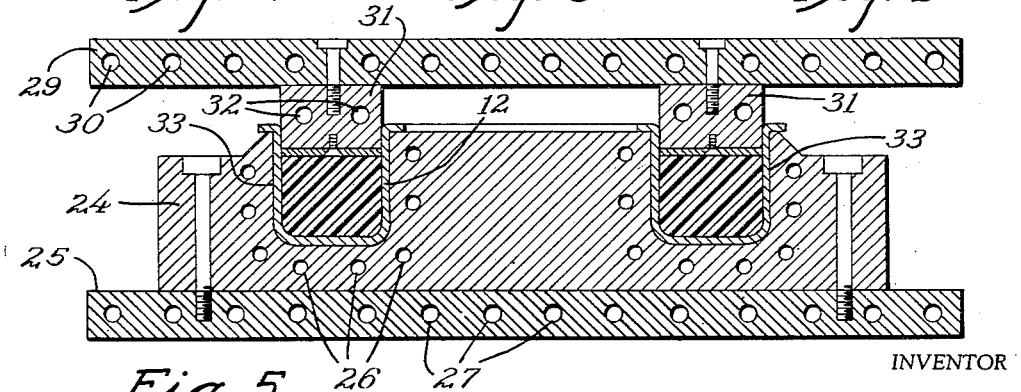
Figure 5 is a sectional view through the mold showing the various parts thereof during the molding process.

The method of producing plastic articles through our method varies substantially with the type of article to be molded and the material from which the article is to be molded. Our method is therefore capable of several variations, all of which have features of similarity. For the purpose of illustration, we will first describe the method of operation which is usually preferred in the molding of bulky compound such as a mixture of sawdust and plastic powder of one type or another. These materials are usually combined to produce a thermo-setting material rather than a thermo-plastic material.

In the molding of bulky compound, we may employ a preforming press including a chase 10 having a mold cavity 11 therein. The mold cavity 11 is of any suitable size or shape and is designed to accommodate the mold liner or molding pan 12. This liner 12 is provided with a smoothly polished inner surface to which the molded plastic will not adhere. The mold liner 12 is usually formed of relatively light gauge material and may be formed by a punch press operation or by any suitable process. In the particular form of construction illustrated the mold cavity and mold liner are ring shaped in form. However, it is obvious that almost any shape may be produced. Simple shapes are particularly adaptable to the present process.

The mold liner 12 fits into the mold cavity 11 freely enough so that it may be readily removed from the cavity at the end of the molding operation. The liner usually fits fairly snugly against the walls of the mold and the liner usually expands somewhat under pressure or at least is in contact with the mold over a considerable portion of its area during operation. At the same time the liner appears to return to its original shape after the molding operation as it may be easily removed from the mold cavity while containing the molded product. Suitable means may be provided for ejecting the molding pan from the mold after the molding operation if it is desired.

When bulky material is to be molded a fence 13 is usually employed to guide the compound into the molding pan. In the particular form of construction illustrated the fence 13 includes an outer ring shaped wall 14 having an outwardly extending flange 15 near its lower extremity and a down-turned peripheral flange 16 to hold the wall in proper position. The fence also includes a cylindrical inner wall 17 having an inturned flange 19 provided with a down-turned marginal flange 20 thereupon. The flanges 15 and 19 of the fence fit over the out-turned flanges 21 of the molding pan 12 and the down-turned flanges 16 and 20 properly locate the walls with respect to the molding pan. The fence merely acts to contain the bulky compound in its extended condition before the material is compressed so that the mold itself may be relatively shallow.

The preforming press is likewise provided with a punch mounting plate 22 on which is supported the punch 23. The punch 23 is of proper size and shape to fit into the fence 13 and to force material downwardly within the fence and to compress it in the mold pan 12. The pressure developed by the press 22 compacts or preforms the molding compound without molding or changing the chemical nature of the compound.

The compound is thus compacted into the mold pans 12 by the press 22. The preformed body thus formed may next be inserted directly in the plastic mold press or may, if desired, be preheated. If it is desired to preheat the molding compound this may be done in a suitable oven or similar preheating chamber. If desired the molding pan containing the preformed compound may pass through a heater in a continuous operation. The handling of the preformed compound in the mold pans or liners is particularly advantageous where bulky material is to be molded as the preformed compound will often not adhere together well enough to be removed from the preforming press without falling apart or crumbling if no such pan is employed.

The present formed compound is next placed in the molding press chase or mold support 24. This support 24 is mounted upon the chase mounting plate 25 in the usual manner. The chase 24 is provided with ports 26 through which heating or cooling means may provide suitable molding temperatures. The mounting plate 25 is usually likewise provided with ports 27 for a similar purpose.

The press is likewise provided with a punch mounting plate 29 of any suitable shape or design. This plate 29 is usually provided with ports 30 therethrough. A punch 31 is mounted upon a mounting plate 29 and is usually likewise provided with ports 32 therethrough. The punch 31 is of proper size and dimensions to fit within the molding pan 12 and to compress the molding compound therein.

After the compound has been suitably compressed and formed or cured, the punch 31 is withdrawn and the molding pan 12 may be removed from the chase or mold support 24. This action may take place as soon as the punch is withdrawn sufficiently to permit removal of the molding pan and its contents. A new molding pan is next inserted into the mold cavity 33 of the chase 24 and the cycle is again repeated.

Thus it will be seen that the molded part may be removed from the chase virtually as soon as the mold is opened far enough to permit such removal and a new molding pan can be immediately inserted as it is not necessary to fill the mold cavity with the compound, little time is required to exchange mold pans in the cavity. Furthermore, as the bulky material has been precompressed to a fraction of its original bulk, the stroke of the press may be materially reduced. Oftentimes the cycle of operation may be cut in two by using the present method. This fact is of extreme importance when the cost of operation is considered.

In Figures 6, 7, and 8 of the drawings we disclose a modified method of molding which is particularly adaptable for use with compression molding of thermoplastic compounds. This second method has the advantage of eliminating the cooling cycle of the molding press and thereby considerably decreases the molding cycle.

In Figures 6 and 7 of the drawings we disclose diagrammatically a plastic molding press including a chase mounting plate 34 upon which is supported a chase or mold support 35. This mold support is provided with a mold cavity 36 of proper size to accommodate a mold liner or molding pan 37 formed of sheet metal or similar material. This molding pan 37 is shown as being ring shaped in form and is provided with an inturned flange 39 and an outwardly turned marginal flange 40.

The molding press is also provided with a punch mounting plate 41 on which is supported the punch 42. A punch cover 43 is shown supported by the punch 42. This punch cover 43 need not necessarily fit onto the punch 42 in the manner illustrated, but in actual practice may, if desired, be rested upon the top of the molding pan 37.

The punch cover 43 is of proper size to fit into the upper end of the molding pan 37 and to form the upper surface of the product molded. The shape of the cover 43 is such as to provide the desired configuration on the molded product. The punch cover 43 is provided with an inturned flange 44 and an outwardly turned peripheral flange 45. The flanges 44 and 45 abut against the molding pan flanges 39 and 40 and fit in surface contact therewith or substantially so in closed position of the mold.

Peripherally spaced clamps 46 are provided to hold the punch cover 43 in place upon the upper extremity of the mold pan 37. These clamps may be of any suitable shape or design and act merely to hold the two removable parts of the mold together when and after the mold is closed.

In Figure 7 of the drawings we disclose the mold in closed position with the molding compound compressed and the mold parts in proper relationship. The clamps 46 are shown holding the two parts of the mold against separation. The clamps 46 must be applied while the press is closed so as to prevent separation of these parts as the punch is withdrawn.

With this form of construction, it is believed obvious that as soon as the punch 42 has been withdrawn sufficiently to permit removal of the molding pan 37, this molding pan with the cover 43 clamped thereto may then be removed from the mold cavity and replaced with a new molding pan and cover. As a result the plastic molded object may be removed from the mold while in a fluid or partly fluid state if desired and accordingly the mold and punch need not be chilled. The chilling of the punch and mold and the reheating of these elements takes considerable time, which could be saved through the use of the mold pan and cover. After removal from the chases the molded product enclosed within the molding pan and punch cover may be placed in a cooling unit until the plastic is thoroughly set. The cover may then be removed and the molded object removed from the molding pan.

With the foregoing method the preheating of the molding compound is optional. The preheating of the compound usually saves some time during the molding cycle, but as the mold chase and punch may be maintained at an elevated temperature the molding cycle is extremely short even when the compound is not preheated.

A similar process may be carried out without heating the mold chase and punch if the liner, the contained compound, and the punch cover are preheated. In this variation of our method the mold pan is first filled with the desired amount of compound and the pan and cover are preheated so as to soften the compound or to bring it to a temperature where it may be quickly molded. The hot compound in its heated pan and cover is quickly placed in the relatively cool press and the punch is actuated to press the punch cover into the mold pan. The pressure thus exerted, together with the heat of the molding compound and the liner and cover quickly mold the compound into the desired shape. As soon as the compound is molded it tends to chill and set quickly as the chase and punch are relatively cool. With this method the cover may often be removed immediately after the punch has been withdrawn, as the plastic has been set sufficiently to eliminate the need therefor.

Our method has also been found particularly adaptable for use in combining two plastics or in covering a core of previously molded or formed material with a covering surface. For example we have found that large objects may be molded from saw dust containing a resin binder and other additives and then covered with a thermoplastic or thermo-setting covering. Such a body is illustrated in Figure 11 of the drawings, the core 47 being formed of a combination of sawdust with suitable resin or resins and the covering 49 being of thermoplastic. This result is accomplished by first molding the core 47 in the manner previously described. The core is next covered by placing in the molding pan a thermoplastic sheet or thermoplastic powder capable of forming an integral covering when subjected to heat and pressure. A thermoplastic sheet may be placed over the cavity in the mold pan beneath the pre-molded core and another sheet of plastic may be placed on top of the core. As the punch moves downward it forces the precast core and the covering sheets into the pan cavity and subjects the combined structure to heat and pressure. The plastic sheet unites to form an integral covering encircling the core. Thus a relatively low cost molded object may be produced having the advantages both of the relatively coarse molded material forming the core and of the relatively hard smooth covering of thermoplastic.

It will be seen that through the use of removable mold pans, with or without the punch covers, we may produce molded plastic articles at a higher rate of speed than is normally possible. The molds may be inexpensively formed and finished and as the molding pans provide a smooth interior finish which is replaceable, the normal cost of the mold may be reduced. Furthermore, by using a series of mold pans in conjunction with a single mold cavity, there is little danger of loss of production due to an injury to the mold. If one of the mold pans becomes damaged in some manner, it may be discarded and other mold pans employed. These mold pans may be easily cleaned as they are readily accessible for the cleaning operation. Furthermore, the mold chase or support need not be formed with the extreme accuracy usually required, as this cavity forms mainly a support for the relatively thin liner or pan and does not form the actual surface which comes in contact with the plastic molded. It is obvious that individual mold pans can be produced more quickly and at less cost than the original molds. A die may be formed which is of the exact shape of the article to be produced. The sheet metal forming the mold pans is drawn over this die in such a manner as to accurately form the mold pans. The dies required to form the metal pans are usually much easier and less costly to produce than molds employed for casting plastic because of the smoothness to which the interior of the mold must be finished. As the sheet of which the mold pans are formed may be readily polished smoothly before the pan forming operation, much of the polishing labor is avoided. As a result multiple mold chases with a series of mold pans may often be formed as inexpensively as a single highly polished mold cavity of the same shape. As the method employing a plurality of mold pans greatly reduces the molding cycle, substantial operational savings may be effected.

Figure 12:
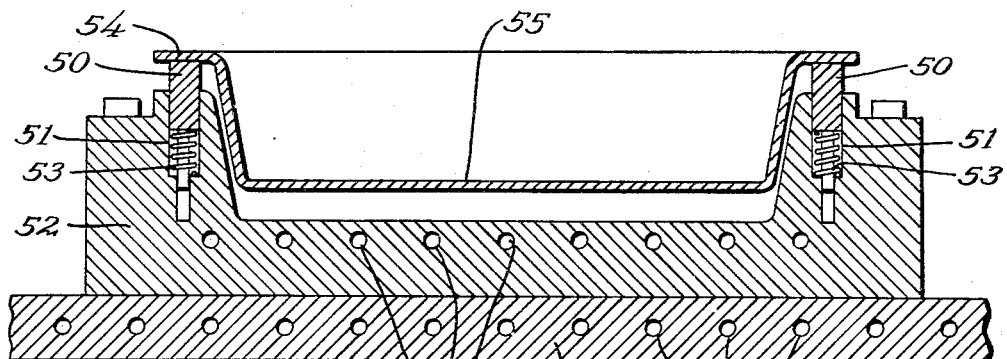
Figure 12 is a cross sectional view through a chase and mold pan showing means for elevating the mold pan out of contact with the chase.

In Figure 12 of the drawings we disclose an apparatus for elevating the mold pan from the mold cavity while the mold punch is not in contact therewith. Such an arrangement has definite advantages in the molding arrangement. Where molding compound is placed into a heated mold cavity, the heat of the mold sometimes tends to precure a portion of the plastic contacting the walls of the mold. Where the mold cavity is heated to a temperature insufficient to precure the plastic material placed therein, the heat of the cavity walls tends to drive the moisture contained in the compound away from the heated molds, thus producing an imperfect molded product. The migration of moisture away from the cavity walls tends to produce warping and cracking of the finished product. Thus it is desirable that the compound be heated as uniformly as possible at the time the mold is closed.

As indicated in Figure 12 of the drawings we provide a series of vertically slidable plungers 50 which are mounted in suitable apertures 51 in the chase 52. Springs 53 are interposed between portions of the plungers 50 and the chase 52. These springs tend to urge the plungers 50 upwardly. The plungers 50 are shown engaging the marginal flange 54 of a mold pan 55 of the type previously described which fits into the chase 52. The chase is heated by fluid or any other suitable means, fluid passages 56 being shown to accommodate this heating fluid. The chase 52 is mounted upon the mounting plate 57 which may also be heated by a suitable fluid passing through the passages 59.

The plungers 50 normally hold the mold pan 55 in an elevated position so that the major portion of the pan is out of contact with the walls of the mold cavity. As a result the heating of the mold pan through direct contact with the chase is prevented until the punch presses the mold pan against the base of the mold. In other words, the mold pan is heated only by radiation from the chase during the time the mold pan is suspended in spaced relation to its molding position. When the mold punch presses the molding pan into the mold cavity, the pan is in close contact with the mold cavity and is quickly heated throughout by conduction. As a result the moisture within the molding compound does not have time to migrate away from the heated surface before the molding operation takes place and before the pressure is applied.

The plungers 50 are shown engaging the marginal rim 54 of the mold pan. Obviously these plungers may be positioned directly under the bottom of the mold pan and may be of any suitable size or shape. The plungers 50 also act to strip the mold pan from the mold cavity after the molding operation, thereby facilitating the removal of the mold pan from the mold.

Figure 13:
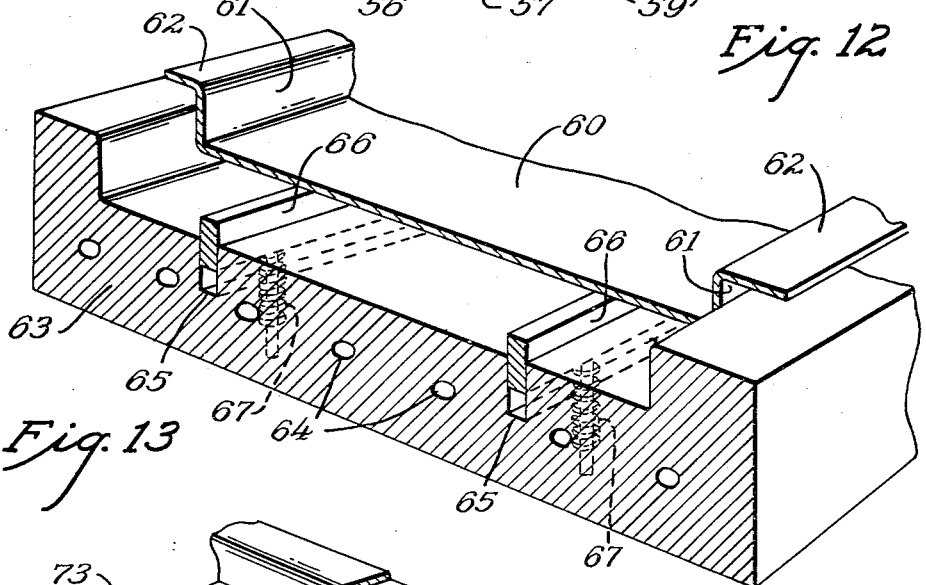
Figure 13 is a view similar to Figure 12 showing a modified form of mold elevating means.

In Figure 13 of the drawings I disclose a modified form of construction which is useful in conjunction with certain types of molds. The arrangement illustrated in Figure 13 is particularly adaptable for use when large panels are being produced. In this arrangement the mold pan 60 may comprise merely a flat sheet of suitable material having side walls 61 and possibly marginal flanges 62. The compound is spread uniformly upon the panel 60 between the side walls 61 and a suitable mold punch is designed to compress the material upon the panel 60. During the molding operation the panel 60 is supported by the bed 63 which is heated by any suitable means such as by heating fluid passing through the passages 64, by suitable electrical heating elements or by any other practical heating means.

In the construction illustrated in Figure 13, the bed 63 is provided with a pair of grooves 65 therein which support vertically movable bars or rails 66. These bars or rails 66 are normally urged upwardly by springs 67 which fit into cavities beneath the grooves 65. When the molding operation is taking place the downward pressure of the mold punch on the upper portion of the mold retracts the bars 66 into the groove 65 until they are flush with the surface of the bed. This compression may take place either by downward movement of the punch or by upward movement of the bed.

It will be seen that prior to the actual molding operation the only portion of the member 60 in contact with a portion of the bed are the areas directly above the bars 66. Due to the fact that the bars 66 are slidably supported, these bars are not heated to as high a temperature as the remainder of the bed 63. Thus the tendency for moisture to migrate due to the application of heat against the panel 60 is avoided until the panel 60 is forced downwardly against the bed 63.

Figure 14:
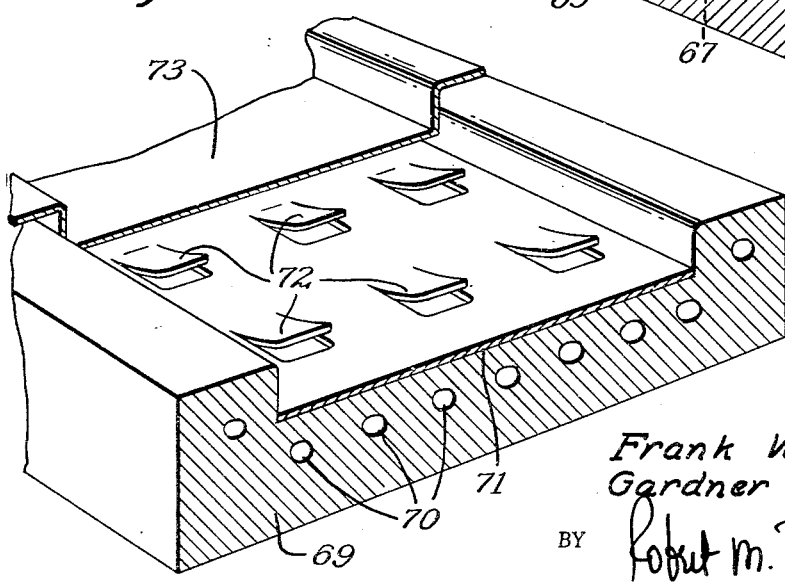
Figure 14 is a view similar to Figures 12 and 13 showing still another form of mold elevating means.

Figure 14 illustrates a modified manner of accomplishing the result just described. In this figure we disclose a mold bed 69 which is heated in any suitable manner as by heated fluid passing through fluid passages 70. A thin plate 71 of heat conductive material overlies the bed 69. A series of tongues 72 of the resilient material forming the spring plate 71 are cut from the plate along three adjoining edges and are bent normally out of the plane of the remainder of the sheet 71. These tongues 72 engage the bottom of the mold pan or chase 73 and hold this element elevated out of contact with the heated bed 69 until pressure is applied thereto. When force tending to close the mold provides relative movement between the punch and the mold bed, the member 73 is forced against the plate 71. The tongues 72 straighten out and form a solid substantially continuous support for the member 73. The lines of contact between the tongue 72 and the member 73 are insufficient to heat the contents of the member 73 substantially prior to the molding operation.

In accordance with the patent statutes, we have described the principles of construction and operation of our method and apparatus for molding plastic, and while we have endeavored to set forth the best embodiment thereof, we desire to have it understood that obvious changes may be made within the scope of the following claims without departing from the spirit of our invention.

We claim:

1. A mold structure including a chase, a mold liner supported by said chase and expandable under pressure against said chase for support thereby, and resilient means on said chase for normally holding said mold substantially out of contact with said chase, said resilient means normally providing an open air space between said mold and said chase.

2. A mold structure including a base, means for heating said base, supporting means on said base, a mold pan supported by said supporting means and held substantially out of contact with said base thereby to minimize heat transfer from the base to the pan, and means for moving said pan into contact with said base.

3. The method of molding loose, bulky compound containing a thermosetting resin in a press having a heating receptacle thereupon designed to snugly accommodate a removable mold, a punch movable relatively to the heating receptacle toward and away therefrom, the mold being a relatively thin walled member of material of high heat conductivity, the method including the steps of placing the compound in the mold while separated from the heating receptacle, preforming the compound while in said mold, preheating the mold and compacted compound at a temperature below the reaction temperature of the thermosetting resin while the compound remains in the mold, transferring the preheated mold and compound therein into the heating receptacle of the press, subjecting the compound to pressure and maintaining sufficient pressure and temperature to thoroughly react the thermosetting resin and to form a rigid product in the mold, and removing the rigid product from the hot mold.

4. The method of molding bulky, plastic compound having poor flow characteristics in a mold which snugly fits into a correspondingly shaped heating receptacle in a molding press, the method consisting in placing in the mold a desired amount of a compound consisting essentially in sawdust and a thermosetting resin binder, compressing the compound in a cold press to preform the same, placing the mold and preformed compound in the correspondingly shaped heating receptacle, compressing the compound at temperatures sufficiently high and for a sufficient time to react the resin, removing the mold while still hot from the heating receptacle, and removing the reacted compound at any suitable time thereafter from the mold.

5. The method described in claim 4 and including the further step of preheating the preformed compound and mold to a temperature below the reaction temperature of the thermosetting resin prior to inserting the same in the heating receptacle.

6. The method of molding bulky plastic compound having poor flow characteristics in a mold which snugly fits into a correspondingly shaped heating receptacle in a molding press and through the use of a mold fence, the method consisting in placing in the mold and within the fence a desired amount of a compound consisting essentially in sawdust and a thermosetting resin binder, compressing the compound cold to preform the same into the mold, separating the mold and fence and placing the preformed compound and mold into the correspondingly shaped heating receptacle, applying pressure and heat to the compound for a time sufficient to react the resin, removing the mold and reacted compound while hot, and removing the reacted compound from the mold at any time after removal from the heating receptacle, the compound remaining in the mold continuously during the steps of the process.

7. The method described in claim 6 and including the further step of heating the compound and mold to a temperature below the reaction temperature of the resin prior to insertion of the mold and compound into the heating receptacle.

8. The method of molding bulky plastic compound in a mold which snugly fits into a correspondingly shaped heating receptacle in a molding press, the method consisting in the steps of placing in the mold a desired amount of a compound consisting essentially in sawdust and a thermosetting resin binder, preheating the compound contained in the mold to a temperature below the reaction temperature of the resin binder, placing the preheated mold and compound in the heating receptacle, compressing the compound in the mold while maintaining a temperature above the reaction temperature of the resin binder for a time sufficient to thoroughly react the resin binder and to form a desired shape which is self-sustaining and substantially set in shape, removing the hot reacted compound and hot mold from the heating receptacle, and removing the reacted compound from the mold at any time after removal from the heating receptacle.

References Cited in the file of this patent

UNITED STATES PATENTS

| Number | Name | Date |
|---|---|---|
| 331,737 | Rubin | Dec. 1, 1885 |
| 369,784 | Furman | Sept. 13, 1887 |
| 1,359,919 | Reardon | Nov. 23, 1920 |
| 1,406,542 | Crocker | Feb. 14, 1922 |
| 1,946,770 | Strongson | Feb. 13, 1934 |
| 1,953,704 | Erdmann | Apr. 3, 1934 |
| 2,010,669 | Hopkin | Aug. 6, 1935 |
| 2,130,254 | Visman | Sept. 13, 1938 |
| 2,289,524 | Smith et al. | July 14, 1942 |
| 2,317,597 | Ford et al. | Apr. 27, 1943 |
| 2,324,978 | Lohrand et al. | July 20, 1943 |
| 2,336,578 | Skoning | Dec. 14, 1943 |
| 2,390,266 | Novotny | Dec. 4, 1945 |
| 2,421,058 | Eckstein | May 27, 1947 |
| 2,443,826 | Johnson | June 22, 1948 |
| 2,457,440 | Booth | Dec. 28, 1948 |
| 2,461,600 | Gray | Feb. 15, 1949 |
| 2,497,009 | Minuto | Feb. 7, 1950 |